UNITED STATES PATENT OFFICE.

CARLETON ELLIS, OF MONTCLAIR, NEW JERSEY.

ART OF MAKING CATALYZERS.

1,378,336.   Specification of Letters Patent.   Patented May 17, 1921.

No Drawing.   Application filed February 8, 1916.   Serial No. 76,957.

*To all whom it may concern:*

Be it known that I, CARLETON ELLIS, a citizen of the United States, and a resident of Montclair, in the county of Essex and State of New Jersey, have invented certain new and useful Improvements in the Art of Making Catalyzers, of which the following is a specification.

This invention relates to the art of making catalyzers adapted for hydrogenating fatty oils and other unsaturated bodies and for similar purposes and relates especially to a process of preparing an easily suspendable finely-divided catalyzer, preferably consisting of or containing nickel material, of predetermined degree of subdivision in adequate distribution in the liquid vehicle or substance to be hydrogenated, particularly by the use of organic compounds of nickel or other metal employed, all as more fully hereinafter described and as claimed.

This application contains matter disclosed in the file of Patent No. 1,026,156 filed Oct. 23, 1911, and issued May 14, 1912, and in a continuing application Serial No. 686,988 now Patent 1,217,118, also Serial No. 808,461 filed Dec. 23, 1913, in so far as organic salts of nickel, decomposable by heating especially in the presence of hydrogen, are concerned.

The catalyzer raw material or potential catalyst employed is preferably an organic compound of a catalytic metal. Included among the latter are the base metals; copper, nickel, cobalt and iron (which group of metals is hereinafter referred to under the expression "metal having an atomic weight between 56 and 64") but other metals may be employed, including composite catalyzers such as nickel-gold, copper-cerium, cobalt-silver and the like. The element nickel will be used herein in an illustrative sense as typical catalytic material.

From metals of the list stated, an organic acid salt, or analogous compound may be prepared, from which the active catalytic agent is derived. The said salt or compound preferably should be one which will lend itself readily to the formation of metal in a readily disseminable condition which has certain advantages, one of which apparently is the diminished tendency to convert fatty material into unsaponifiable hydrocarbons.

Bodies suitable for the present purpose are compounds of the metals having catalytic activity with the fatty acids such as formic, acetic, butyric, oleic, stearic, and palmitic acids and the like. Thus nickel acetate, formate, butyrate, stearate, palmitate or oleate may be used to produce a catalyzer, without liability to produce objectionable hydrocarbon bodies.

The metallo-organic compound may be prepared by dissolving nickel hydrate in the appropriate acid, heating and stirring the mass, if necessary. The product is then dried and powdered. The dry powdered product is mixed with some oil and heated to the decomposing temperature, for example while in a current of hydrogen.

One method of decomposing the organic nickel salt is to mix it with a small quantity of oil and heat in a closed chamber to about 180° C., although decomposition will take place in some instances at a lower temperature. An inky black product is obtained and this may be added to a large quantity of oil to introduce perhaps $\frac{1}{4}$ to $\frac{1}{2}$ of 1% of nickel when hydrogenation takes place readily on suitable contact with hydrogen.

Or the nickel salt is added to the oil continuously or intermittently for a sufficient period until the oil is more concentrated in precipitated nickel. Thus, oil containing 5, 10, 15, 25 or 50% or so of nickel may be obtained and the oily mass carrying this finely divided metal may be added as desired to a sufficient quantity of oil in suitable treating apparatus so as to introduce one-fourth, or one-half of one per cent. or so of this catalyzer as desired and the oil hydrogenated under proper thermal conditions.

Thus a catalyzer is prepared by concentrating the liberated nickel in a body of oil and a new article of manufacture is thereby obtained, namely, finely-divided nickel liberated from an organic nickel compound by thermal decomposition in a body of oil which metal is sealed from the air by the presence of the oil, and because of the viscosity or other properties of the oily material, the nickel does not precipitate in a gross or coarse form in which it would be less active. On the other hand, it is undesirable to liberate the nickel under such conditions that the oil is charged with particles of nickel which cannot be filtered very readily unless it is desired to obtain the nickel in a colloidal condition and due allowance made therefor in connection with subsequent treatment.

By decomposing the nickel compound in a relatively small body of oil and then mixing with a large body of oil a control over the size of grain or character of the precipitation may be had to a considerable measure and this is of importance in connection with the subsequent operations of filtration. By decomposing the nickel compound at different temperatures, catalyzers of varying activity and filtering properties may be obtained and hence the desirability of preparing the catalyzer in a small body of oil and subsequently transferring same to a larger body of oil.

If the oil in which the nickel salt is decomposed is not one which should be added in large quantities to the oil to be hydrogenated, as for instance if a fatty oil is to be hydrogenated and the catalyzer has been prepared in a petroleum oil, the precipitated nickel in the small body of petroleum oil may be filtered to remove the oil as much as possible, or in fact the oil may be extracted by volatile solvents if desired and the nickel material then added to the oil which is to be hydrogenated.

In carrying out the present method it is desirable to use compounds which, upon heating, throw off the organic radical completely, such for example as nickel formate, acetate, oleate and the like. The organic materials formed, such as the acid radical may be removed to good advantage by heating under partial vacuum which tends to remove the acid radical, or facilitate the decomposition of the compound. In the case of such nickel salts of the fatty acids the material may be heated in oil to about 250° C. while a slow current of hydrogen is allowed to pass through the mixture, preferably employing agitation to cause the nickel salts and the products of reaction to be kept in suspension. If the organic radical is permitted to stay in the oil it may have some prejudicial action on the catalyzer and therefore dicarboxylic acids or hydroxy acids of a practically non-volatile character even under high vacuum, should not be used when they tend to leave a residue affecting the catalytic material.

The operation being carried out at a reduced pressure, while a current of hydrogen is led through the liquid is the preferred mode of carrying out the invention, since these steps both aid in volatilizing the fatty acid, and any of the acids above referred to will thus be driven out of the solution or decomposed.

What I claim is:—

1. The process of making catalytic material adapted for use in the hydrogenation of fatty oils which comprises incorporating an organic salt of nickel in an oily vehicle, in heating the mixture while under a pressure below atmospheric, and in removing at least the major portion of the organic radical.

2. The process of making catalytic material adapted for use in the hydrogenation of fatty oils which comprises heating an organic salt of nickel under reducing conditions and under a pressure below atmospheric, and in volatilizing at least a substantial portion of the organic radical.

3. In the preparation of catalysts, the step of subjecting a salt derived from a metal suitable for use as a hydrogenating catalyst and a somewhat volatile organic acid, while such salt is carried in a bath of oil, to heat while passing a current of hydrogen through said bath, and removing by heat at least a considerable portion of the liberated organic acid, while maintaining the pressure slightly below atmospheric.

4. A process of making a catalytic material adapted for the hydrogenation of fatty oils, which process comprises the step of heating a salt containing the radical of such an organic acid as is capable of being volatilized, combined with a metal which is itself capable of acting as a catalyst in the hydrogenation of fatty oils, under reducing conditions, and heating sufficiently to remove at least a material portion of the organic acid radical present in such salt, under pressure below atmospheric.

5. A process of making a catalytic material which comprises incorporating a salt derived from a somewhat volatile organic acid, and a metal having catalytic properties, while associated with an oily vehicle, and passing a current of hydrogen through said mass at a pressure materially below atmospheric.

6. In the preparation of catalysts, the step of subjecting a salt of a metal suitable for use as a hydrogenating catalyst with a somewhat volatile organic acid, while carried in a bath of oil, to heat under reducing conditions, and while maintaining the mass under partial vacuum, removing from the reaction mass at least a considerable portion of the organic acid radical which was combined with the metal.

7. In the production of a catalyst suitable for use in hydrogenating oils, the step of subjecting a carbon-containing compound of a catalytic material, in a state of admixture with an oily vehicle, to decomposition at an elevated temperature, and removing the non-metallic products of such decomposition from the oily vehicle by heat at a pressure below atmospheric.

8. The process of making a catalyzer concentrate which comprises heating a nickel salt of a carbon-containing acid in an oil vehicle, sufficiently to decompose the said salt, and to set free the catalyst in a highly active, finely divided state, the amount of such nickel salt being sufficient to furnish a quantity of nickel catalyzer much in excess of the quantity required for the normal hydrogenation of said oil.

9. The process of making a catalyzer concentrate adapted for hydrogenation of oils, which comprises heating in an oil vehicle, an amount of a finely divided organic salt of nickel, containing nickel equal to not less than 5% of the weight of the oil.

CARLETON ELLIS.